(12) United States Patent
Suzuki et al.

(10) Patent No.: US 11,014,281 B2
(45) Date of Patent: May 25, 2021

(54) LIQUID BLOW MOLDING METHOD

(71) Applicants: Masato Suzuki, Tokyo (JP); Mitsuru Shiokawa, Tokyo (JP)

(72) Inventors: Masato Suzuki, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 309 days.

(21) Appl. No.: 16/094,667

(22) PCT Filed: Feb. 2, 2017

(86) PCT No.: PCT/JP2017/003863
§ 371 (c)(1),
(2) Date: Oct. 18, 2018

(87) PCT Pub. No.: WO2017/187698
PCT Pub. Date: Nov. 2, 2017

(65) Prior Publication Data
US 2019/0118452 A1    Apr. 25, 2019

(30) Foreign Application Priority Data

Apr. 28, 2016 (JP) .............................. JP2016-091805

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B65D 1/00* (2013.01);
(Continued)

(58) Field of Classification Search
None
See application file for complete search history.

(56) References Cited

U.S. PATENT DOCUMENTS

2013/0106027 A1* 5/2013 Maki .................... B29C 49/786
                                                       264/524
2015/0246475 A1* 9/2015 Suyama ................. B29C 49/58
                                                       264/526
(Continued)

FOREIGN PATENT DOCUMENTS

EP     2 255 949 A1    12/2010
EP     2 902 169 A1     8/2015
(Continued)

OTHER PUBLICATIONS

Apr. 25, 2017 International Search Report issued in International Patent Application No. PCT/JP2017/003863.
(Continued)

*Primary Examiner* — Matthew J Daniels
*Assistant Examiner* — Gregory Chad Grosso
(74) *Attorney, Agent, or Firm* — Oliff PLC

(57) ABSTRACT

A liquid blow molding method molds a bottomed tubular-shaped preform into a liquid containing container. The method includes a nozzle engaging step of engaging a blow nozzle with a mouth of the preform; a molding step of molding the preform into a container of a predetermined shape by supplying a pressurized liquid from a pump into the preform; a suck-back step of sucking back a predetermined volume of liquid out of the container into a supply path; a nozzle closing step of closing the blow nozzle by a sealing body; and a discharge step of discharging a liquid in the supply path by a predetermined volume from a discharge port by operating, after the nozzle closing step, a pump in a positive direction with the discharge port connected to the supply path opened.

8 Claims, 7 Drawing Sheets

(51) Int. Cl.
    *B65D 1/00*     (2006.01)
    *B29K 67/00*     (2006.01)
    *B29L 31/00*     (2006.01)

(52) U.S. Cl.
    CPC ............ *B29C 2049/465* (2013.01); *B29C 2049/4694* (2013.01); *B29K 2067/003* (2013.01); *B29L 2031/7158* (2013.01)

(56) References Cited

U.S. PATENT DOCUMENTS

| | | | | |
|---|---|---|---|---|
| 2015/0328824 | A1* | 11/2015 | Morikami | B29C 49/12 |
| | | | | 425/524 |
| 2016/0243748 | A1* | 8/2016 | Tabata | B29C 49/58 |
| 2017/0008216 | A1* | 1/2017 | Suyama | B29C 49/783 |
| 2017/0312978 | A1* | 11/2017 | Okuyama | B29C 49/46 |

FOREIGN PATENT DOCUMENTS

| | | |
|---|---|---|
| JP | 2013-208834 A | 10/2013 |
| JP | 2015-139988 A | 8/2015 |
| JP | 2015-160432 A | 9/2015 |
| WO | 2014/209341 A1 | 12/2014 |

OTHER PUBLICATIONS

Mar. 3, 2020 Office Action issued in Chinese Patent Application No. 201780025624.0.

Dec. 5, 2019 Extended Search Report issued in European Patent Application No. 17788988.8.

Aug. 11, 2020 Office Action issued in Chinese Patent Application No. 201780025624.0.

* cited by examiner

LIQUID BLOW MOLDING METHOD

TECHNICAL FIELD

The present disclosure relates to a liquid blow molding method for molding a bottomed tubular-shaped preform into a liquid-containing container in which a content liquid is held.

BACKGROUND

Resin containers, typical examples of which are polypropylene (PP) bottles and polyethylene terephthalate (PET) bottles, are used to hold a variety of liquids, such as beverages, cosmetic products, pharmaceutical products, detergents, and toiletries including shampoo, as the content liquids. Such a container is generally produced by blow molding a preform formed by a thermoplastic resin material as mentioned above in a bottomed tubular shape.

Further, as a blow molding for molding a preform into a container, a liquid blow molding in which, instead of pressurized air, pressurized liquid is used as a pressurized medium supplied into a preform is known.

Patent Literature 1, for example, describes a liquid blow molding method for molding a preform into a container of a predetermined shape conforming to a cavity of a mold. In the method, a preform heated in advance to a temperature at which stretchability is achieved is placed in a mold for blow molding, and while the preform is longitudinally stretched by a stretching rod, a liquid pressurized to a predetermined pressure is supplied into the preform through a blow nozzle. According to the aforementioned liquid blow molding method, content liquids, such as beverages, to be held in a container as a final product are used as the liquid to be supplied into the preform. Thus a liquid-containing container in which the content liquid is held is molded easily by molding the container simultaneously with filling the content liquid into the container, and the process of filling the content liquid to the container after molding may be omitted. Accordingly, the production process and the configuration of production line (apparatus) can be simplified.

CITATION LIST

Patent Literature

PTL 1: JP2013208834A

SUMMARY

Technical Problem

In the aforementioned existing liquid blow molding method, in order to provide a predetermined volume of headspace (a space not filled with liquid) in a container after molding, after the liquid blow molding, a stretching rod is withdrawn out of the container with a blow nozzle closed by a sealing body so that a headspace corresponding to a volume of the stretching rod is created in the container.

Further, as another method of providing a predetermined volume of head space in the container, after the liquid blow molding, a suck back may be performed, in which a pump is driven in the reverse direction to suck back a predetermined volume of liquid out of a container after molding toward a supply path.

It is to be noted that, by using a method in which a stretching rod is used and a method by suck back together, even if a large headspace is required in a container such as a container with a pump for holding shampoo or the like as a content liquid, a headspace of a desired size can be formed in a container by a liquid blow molding method.

However, in the liquid blow molding, a liquid catches the air present in a preform as it is supplied into the preform, thus when suck back is performed, a liquid containing a lot of air bubbles may be taken into the supply path. Thus, in the subsequent liquid blow molding, a liquid containing a lot of air bubbles may be supplied from the supply path into the preform, which makes an amount and a pressure of a liquid to be filled into a container after molding unstable. Thus there is a possibility of decline in moldability of a container.

The present disclosure has been conceived in view of the above problem, and the present disclosure is to provide a liquid blow molding method in which a liquid containing container having a headspace in the container can be molded with a high accuracy through repetitive liquid blow molding.

Solution to Problem

The disclosed liquid blow molding method is a liquid blow molding method for molding a bottomed tubular-shaped preform into a liquid-containing container in which a content liquid is held. The liquid blow molding method includes a nozzle engaging step of engaging a blow nozzle connected to a pump through a supply path with a mouth of the preform; a molding step of supplying a pressurized liquid from the pump through the supply path and the blow nozzle into the preform to mold the preform into a container of a predetermined shape; a suck-back step of operating the pump in the reverse direction to suck back a predetermined volume of liquid from the container molded into a predetermined shape in the molding step into the supply path; a nozzle closing step of closing the blow nozzle by a sealing body with a predetermined volume of liquid sucked back out of the container molded into the predetermined shape to the supply path in the suck-back step; and a discharge step of discharging, after the nozzle closing step, a predetermined volume of liquid in the supply path through the discharge port out of the supply path by operating the pump in the positive direction with a discharge port connected to the supply path opened.

In a preferred embodiment of the disclosed liquid blow molding method configured in the aforementioned manner, the preform is axially stretched by a stretching rod in the molding step, and after the closing step, a withdrawing step of withdrawing the stretching rod from the container molded into the predetermined shape in the molding step is performed.

In another preferred embodiment of the disclosed liquid blow molding method configured in the aforementioned manner, a liquid discharged out of the supply path through the discharge port in the discharge step is collected in a supply tank that supplies a liquid to the pump through a collection path.

In yet another preferred embodiment of the disclosed liquid blow molding method configured in the aforementioned manner, a liquid of the same volume as that sucked back into the supply path in the suck-back step is discharged out of the supply path through the discharge port in the discharge step.

Advantageous Effect

According to the present disclosure, a liquid blow molding method by which a liquid containing container having a headspace therein can be molded with a high accuracy by repetitive liquid blow molding can be provided.

DETAILED DESCRIPTION

The present disclosure will be illustrated in more detail below with reference to the drawings.

The disclosed liquid blow molding method is a liquid blow molding method for molding a bottomed tubular-shaped preform into a liquid containing container in which a content liquid is held. The liquid blow molding method includes a nozzle engaging step of engaging a blow nozzle with a mouth of the preform, the blow nozzle being connected to a pump through a supply path; a molding step of supplying a pressurized liquid from the pump through the supply path and the blow nozzle into the preform to mold the preform into a container of a predetermined shape; a suck-back step of sucking back a predetermined volume of liquid from the container molded into the predetermined shape in the molding step into the supply path by operating the pump in the reverse direction; a nozzle closing step of closing the blow nozzle by a sealing body with the predetermined volume of liquid sucked back out of the container molded into the predetermined shape to the supply path in the suck-back step; and a discharge step of discharging a liquid in the supply path by a predetermined volume from a discharge port out of the supply path by operating, after the nozzle closing step, the pump in the positive direction with the discharge port connected to the supply path opened. In other words, the disclosed liquid blow molding method as mentioned above is a method of producing a liquid-containing container configured to collect a content liquid from a preform, and the method can be implemented by using a liquid blow molding apparatus 1 configured as illustrated in FIG. 1, for example.

Figure 1:
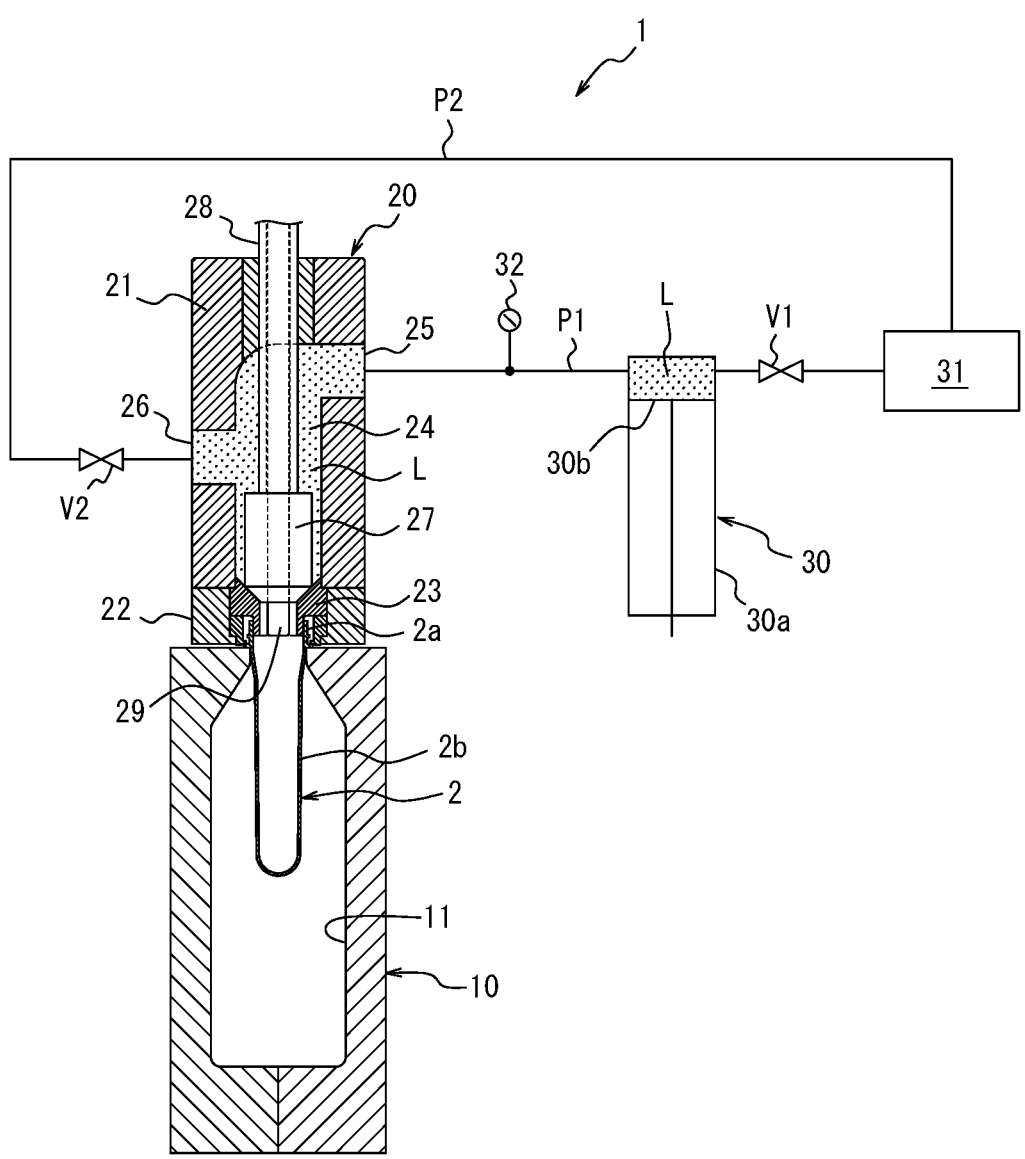
FIG. 1 is an explanatory diagram illustrating an example of a liquid blow molding apparatus used for a liquid blow molding method according to an embodiment of the present disclosure.

The liquid blow molding apparatus 1 illustrated in FIG. 1 is configured to liquid blow mold a preform 2 into a liquid containing container holding therein the content liquid. Liquid blow molding refers to blow molding using a pressurized liquid, instead of pressurized air that is used in air blow molding, as a pressurizing medium (pressurizing fluid) supplied to the preform 2.

Examples of liquid L supplied to the preform 2, in other words, content liquid L held in a liquid containing container after molding include, for example, a variety of liquids, such as beverages, cosmetic products, pharmaceutical products, detergents, and toiletries including shampoo.

As the preform 2, a preform may be used that has been formed by a thermoplastic resin material, such as polypropylene (PP) and polyethylene terephthalate (PET), into a bottomed tubular shape having a cylindrical-shaped mouth 2a as an opening end and a cylindrical-shaped trunk 2b, which is connected to the mouth 2a and has a lower end that is closed.

The preform 2 does not necessarily have the aforementioned shape and may have a variety of bottomed tubular shapes depending on the shape of the container after molding.

Although not illustrated in detail, the mouth 2a is provided, on an outer wall surface thereof, with an engagement projection to attach a closing cap (not illustrated) to the mouth 2a of the liquid-containing container after molding by plugging (undercut engagement). Additionally, a male screw, instead of the engagement projection, may also be provided on the outer wall surface of the mouth 2a, and the closing cap may be attached to the mouth 2a by screw connection.

The liquid blow molding apparatus 1 includes a mold 10 used for blow molding. The mold 10 has a cavity 11, which has a shape corresponding to the final shape, such as a bottle shape, of the container. The cavity 11 is open upward on an upper surface of the mold 10. The preform 2 is fitted in the mold 10, with the trunk 2b being arranged within the cavity 11 of the mold 10 and with the mouth 2a protruding upward from the mold 10.

The mold 10 can be opened left and right, and the liquid-containing container can be taken out from the mold 10 by opening the mold 10 left and right after the preform 2 is molded into a liquid-containing container.

Above the mold 10, there is disposed a nozzle unit 20, which is configured to supply the liquid L into the preform 2. The nozzle unit 20 includes a main body block 21, which is vertically movable relative to the mold 10. The main body block 21 is provided, in a lower end thereof, with a support block 22, and a blow nozzle 23 is supported by the support block 22 to be attached to the lower end of the main body block 21. The blow nozzle 23 is formed in a substantially cylindrical shape and configured to engage, from above, with the mouth 2a of the preform 2 fitted in the mold 10 when the main body block 21 is lowered to the lowermost stroke end.

The main body block 21 is provided, inside thereof, with a supply path 24 that vertically extends. The supply path 24 is a flow path used to supply the liquid L to the blow nozzle 23, and communicates in the lower end thereof with the blow nozzle 23. The main body block 21 is also provided with a supply port 25 that communicates with the upper end of the supply path 24 and a discharge port 26 that communicates with a middle portion of the supply path 24.

In the supply path 24, a sealing body 27 for opening and closing the blow nozzle 23 is disposed. The sealing body 27 is fixed to a lower end of a shaft body 28 that is disposed vertically movable in the nozzle unit 20, and is vertically movable in the supply path 24. The sealing body 27 is formed in a columnar shape, and when moving to the close position, which is the lowermost stroke end position, comes into contact with the upper surface of the blow nozzle 23 on the lower end surface to close the blow nozzle 23. On the other hand, when the sealing body 27 moves upward from the close position, the blow nozzle 23 is opened to communicate with the supply path 24.

As illustrated, the liquid blow molding apparatus 1 may include a stretching rod 29. The stretching rod 29 is inserted into the shaft center of the shaft body 28 such that it is vertically movable relative to the shaft body 28, passes through the shaft center of the sealing body 27 and is retractable from the lower end of the sealing body 27. The stretching rod 29 is driven by the driving source not illustrated and moves downward, thus can axially stretch the preform 2. In this manner, when the stretching rod 29 is provided, the liquid blow molding apparatus 1 can perform biaxial stretch blow molding in which the preform 2 is axially stretched by the stretching rod 29 while being radially stretched by the pressurized liquid L supplied from the mouth 2a. It is to be noted that the liquid blow molding apparatus 1 may not include the stretching rod 29.

The supply port 25 is connected to a pump 30 through a supply path P1. The pump 30 may be configured by a plunger pump that includes a cylinder 30a and a piston 30b, for example.

The pump 30 is connected to a supply tank 31. The supply tank 31 may be configured to hold the liquid L and heat the liquid L to a predetermined temperature, then keep the liquid at the predetermined temperature. An opening-closing valve V1 is provided in a flow path between the pump 30 and the supply tank 31, and the flow path can be opened and closed by the opening-closing valve V1. The reference sign 32 is a pressure gauge provided in the supply path P1.

The discharge port 26 is connected to the supply tank 31 through a collection path P2. In other words, the supply path 24 can communicate with the supply tank 31 through the discharge port 26 and the collection path P2. The collection path P2 is provided with an opening-closing valve V2, and the collection path P2 can be opened and closed by the opening-closing valve V2.

The pump 30 can supply the liquid L pressurized to a predetermined pressure into the preform 2 through the supply port 25, the supply path 24 and the blow nozzle 23 when operating in the positive direction (pressurizing direction) with the blow nozzle 23 opened and the opening-closing valves V1, V2 closed. Further, the pump 30 can suck the liquid L held in the supply tank 31 into the pump 30 when operating in the reverse direction (sucking direction) with the blow nozzle 23 closed by the sealing body 27, the opening-closing valve V2 closed and the opening-closing valve V1 opened. Further, the pump 30 can suck the liquid L held in the supply tank 31 into the pump 30 when operating in the reverse direction (sucking direction) with the blow nozzle 23 closed by the sealing body 27, the opening-closing valve V2 closed and the opening-closing valve V1 opened. Moreover, the pump 30 can discharge a liquid L in the supply path 24 by a predetermined volume from the discharge port 26 to the collection path P2 disposed outside the supply path 24 when operating in the positive direction with the blow nozzle 23 closed by the sealing body 27, the opening-closing valve V1 closed and the opening-closing valve V2 opened.

Operation of the nozzle unit 20, the sealing body 27, the stretching rod 29, the pump 30, the opening-closing valve V1, the opening-closing valve V2 or the like is integrally controlled by a control device not illustrated. This control can be performed with reference to the values of a pressure gauge 32. It is to be noted that, preferably, the opening-closing valve V1 and the opening-closing valve V2 are configured by a solenoid valve that can be controlled by a control device.

Next, a method of molding a bottomed tubular preform 2 into a liquid containing container C of a predetermined shape inside of which a content liquid is held by using the liquid blow molding apparatus 1 configured in the aforementioned manner (the disclosed liquid blow molding method) will be described.

First, the preform 2 heated in advance to a predetermined temperature (e.g. from 80° C. to 150° C.) around which stretchability is achieved by using a heating unit (not illustrated) such as a heater is fitted in the mold 10 and clamped.

When the preform 2 is fitted in the mold 10, subsequently the nozzle engaging step is performed. In the nozzle engaging step, the nozzle unit 20 is lowered toward the mold 10, and the blow nozzle 23 connected to the pump 30 through the supply path 24 is engaged with the mouth 2a of the preform 2. FIG. 1 illustrates a state where the nozzle engaging step is finished. It is to be noted that, in the state where the nozzle engaging step is finished, all of the sealing body 27, the opening-closing valve V1 and the opening-closing valve V2 are closed, and the stretching rod 29 is held to the original position where it does not project downward from the blow nozzle 23.

Figure 2:
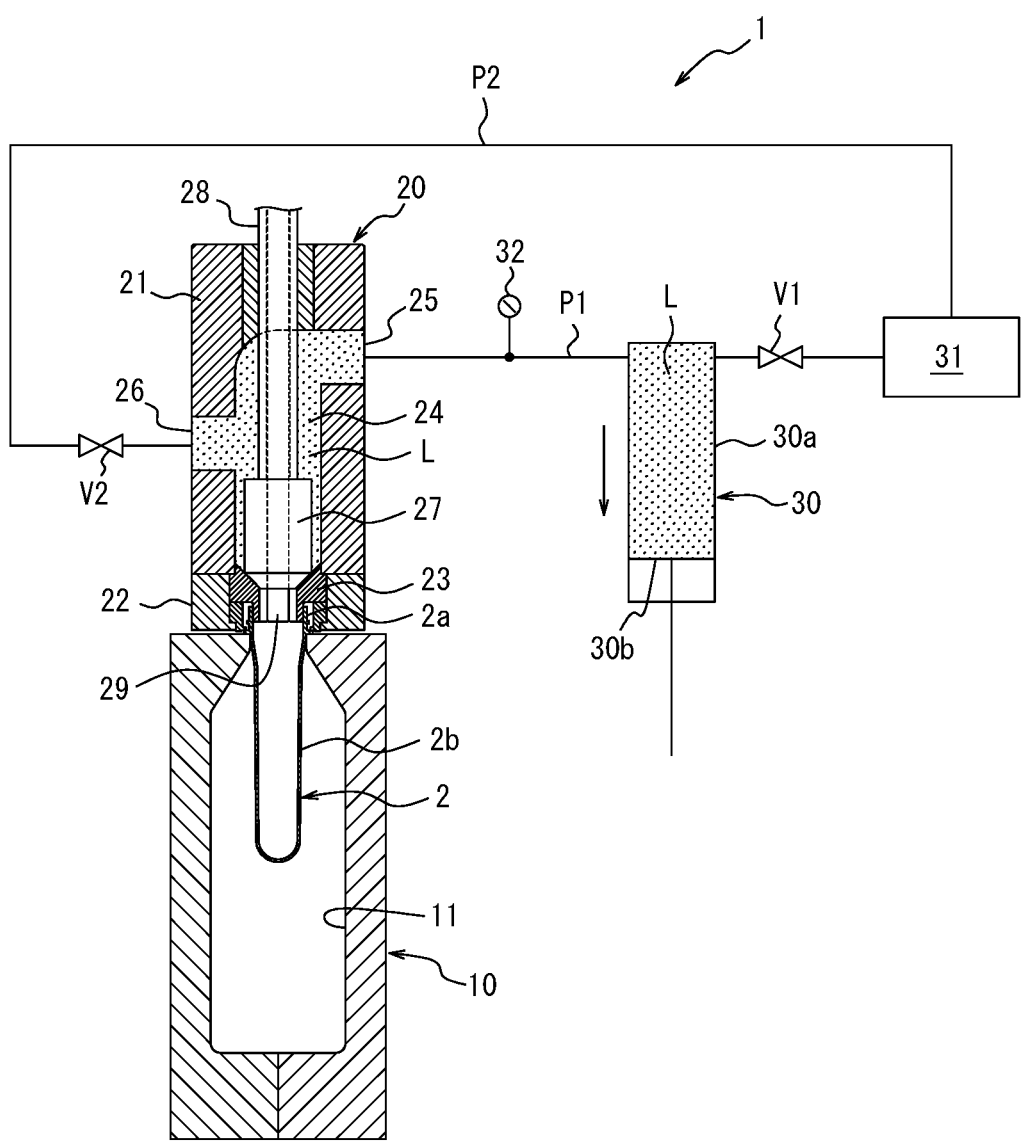
FIG. 2 is an explanatory diagram illustrating the liquid blow molding apparatus with a pump supplied with a liquid.

Next, as illustrated in FIG. 2, the opening-closing valve V1 is opened with the sealing body 27 and the opening-closing valve V2 closed, and in that state, the pump 30 is operated in the reverse direction (sucking direction) so that the liquid L held in the supply tank 31 is sucked into the pump 30. The volume of the liquid L sucked by the pump 30 is set depending on the volume of the liquid containing container C after molding.

Figure 3:
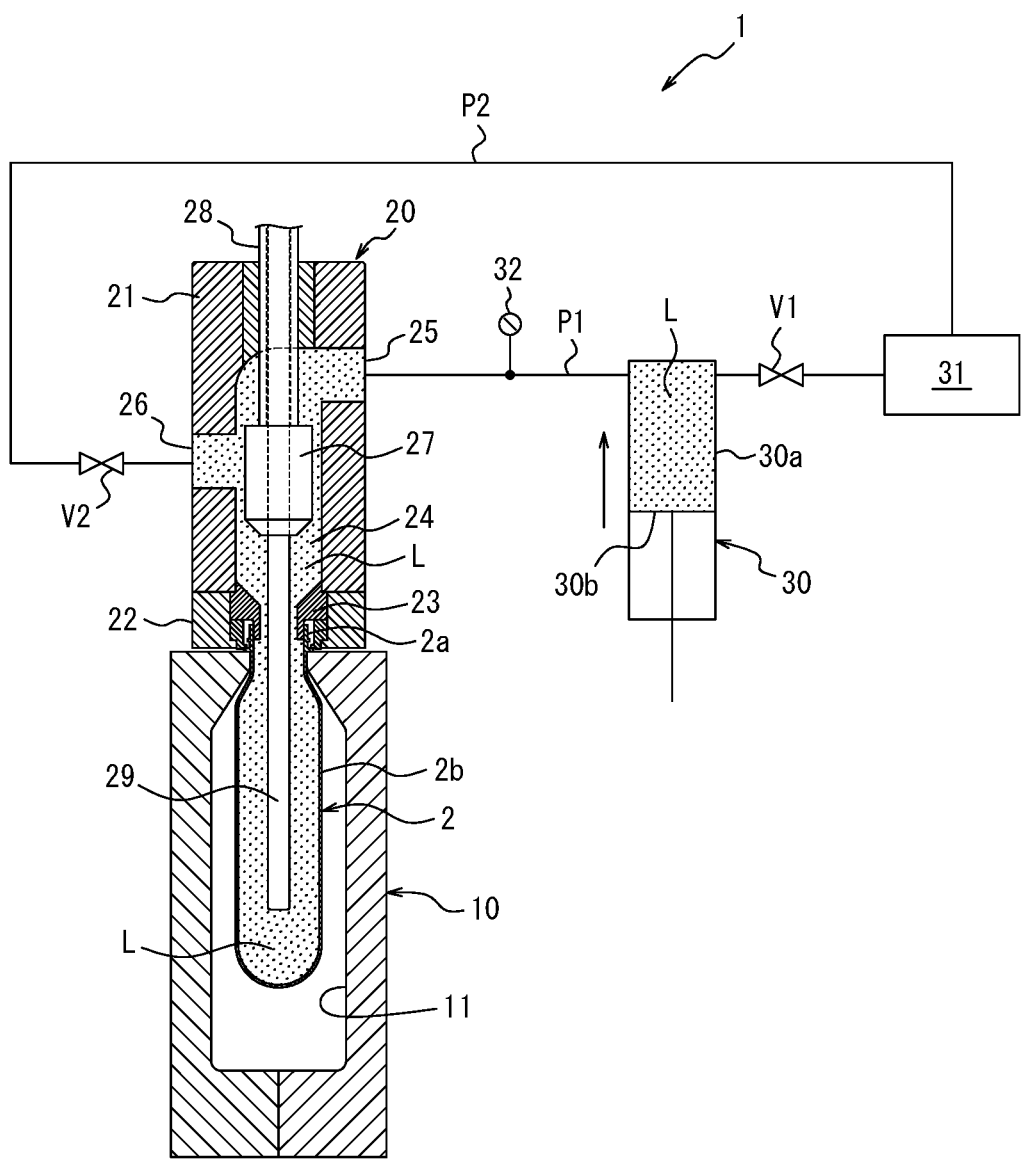
FIG. 3 is an explanatory diagram illustrating the liquid blow molding apparatus during a molding step.
Figure 4:
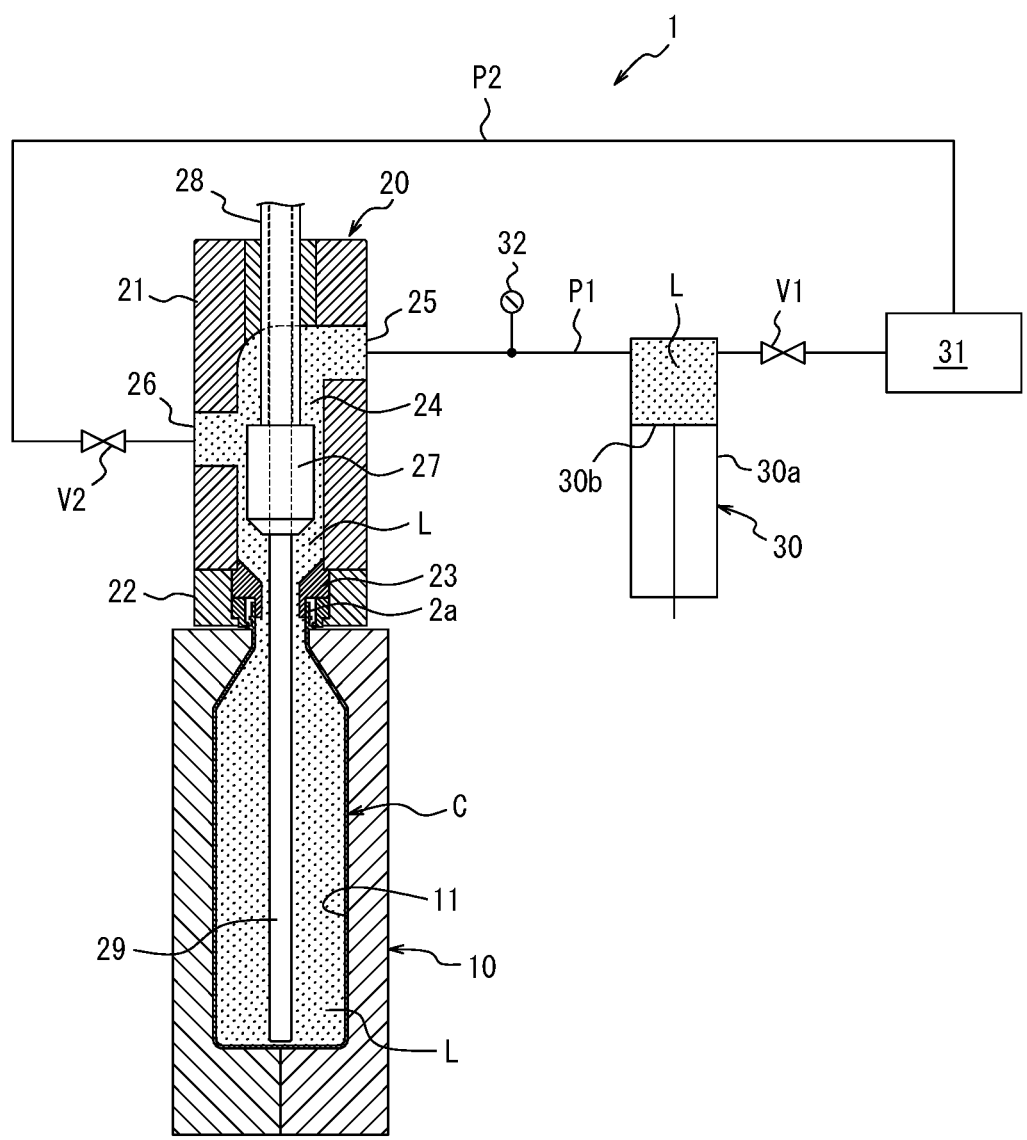
FIG. 4 is an explanatory diagram illustrating the liquid blow molding apparatus when the molding step is finished.

When a predetermined volume of liquid L is sucked into the pump 30, subsequently the molding step is performed. In the molding step, as illustrated in FIG. 3, the sealing body 27 is opened with the opening-closing valve V1 and the opening-closing valve V2 closed, and in that state the pump 30 is operated in the positive direction (pressurizing direction). Thus, the liquid L pressurized to a predetermined pressure is supplied from the pump 30 through the supply path 24 and the blow nozzle 23 into the preform 2, and the preform 2 is molded by the pressure of the liquid L (liquid blow molding). In this molding step, as illustrated in FIG. 4, the preform 2 is molded until it is molded into a liquid containing container C of a predetermined shape conforming to the cavity 11. When the preform 2 is molded into a liquid containing container C as illustrated in FIG. 4, the molding step is finished.

When the liquid blow molding apparatus 1 is provided with the stretching rod 29, in the molding step, the stretching rod 29 is moved forward in a downward direction, and thus the preform 2 can be axially (longitudinally) stretched by the stretching rod 29. This allows for the preform 2 to undergo the biaxial stretch blow molding in which the preform 2 is molded in the biaxial direction with the pressure of the liquid L and the stretching rod 29. According to the biaxial stretch blow molding, the preform 2 can be molded into a liquid containing container C of a predetermined shape with a higher accuracy.

Figure 5:
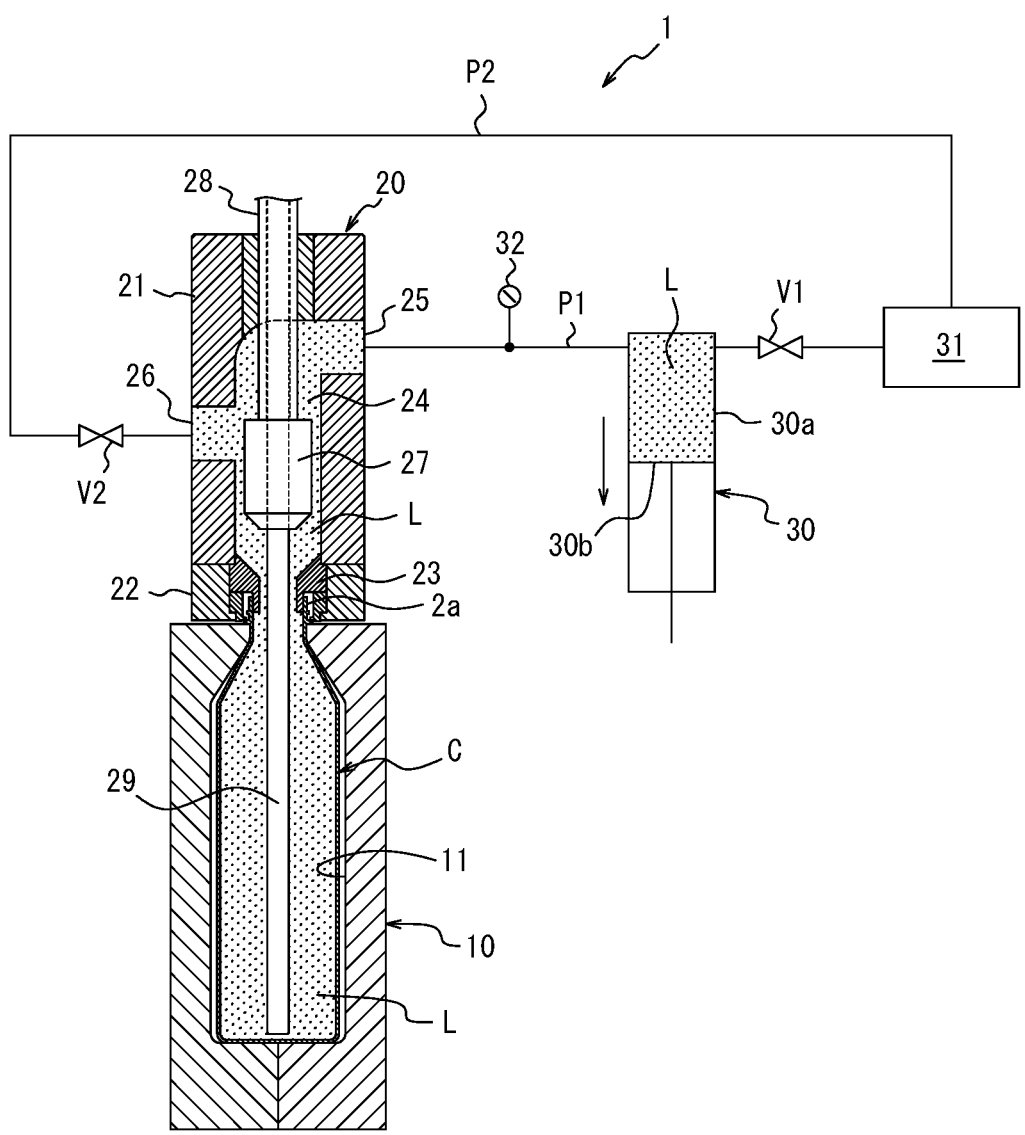
FIG. 5 is an explanatory diagram illustrating the liquid blow molding apparatus during a suck-back step.

When the molding step is finished, subsequently the suck-back step is performed. In the suck-back step, as illustrated in FIG. 5, the pump 30 is operated in the reverse direction with the opening-closing valve V1 and the opening-closing valve V2 closed and the sealing body 27 opened. Thus, a predetermined volume of liquid L is sucked back from the liquid containing container C molded into a predetermined shape in the molding step to the supply path 24. In the suck-back step, the volume of liquid L to be sucked back into the supply path 24 is appropriately set so that the headspace HS provided in the finished liquid containing container C has a predetermined volume. After the suck-back step, the content volume of the liquid containing container C is decreased by the volume of liquid L sucked back into the supply path 24 in the suck-back step, which causes the container C to be in a volume decrease/deformation state where a gap is generated between the container C and the cavity 11, and the pressure inside the container C is a negative pressure which is lower than the atmospheric pressure.

Figure 6:
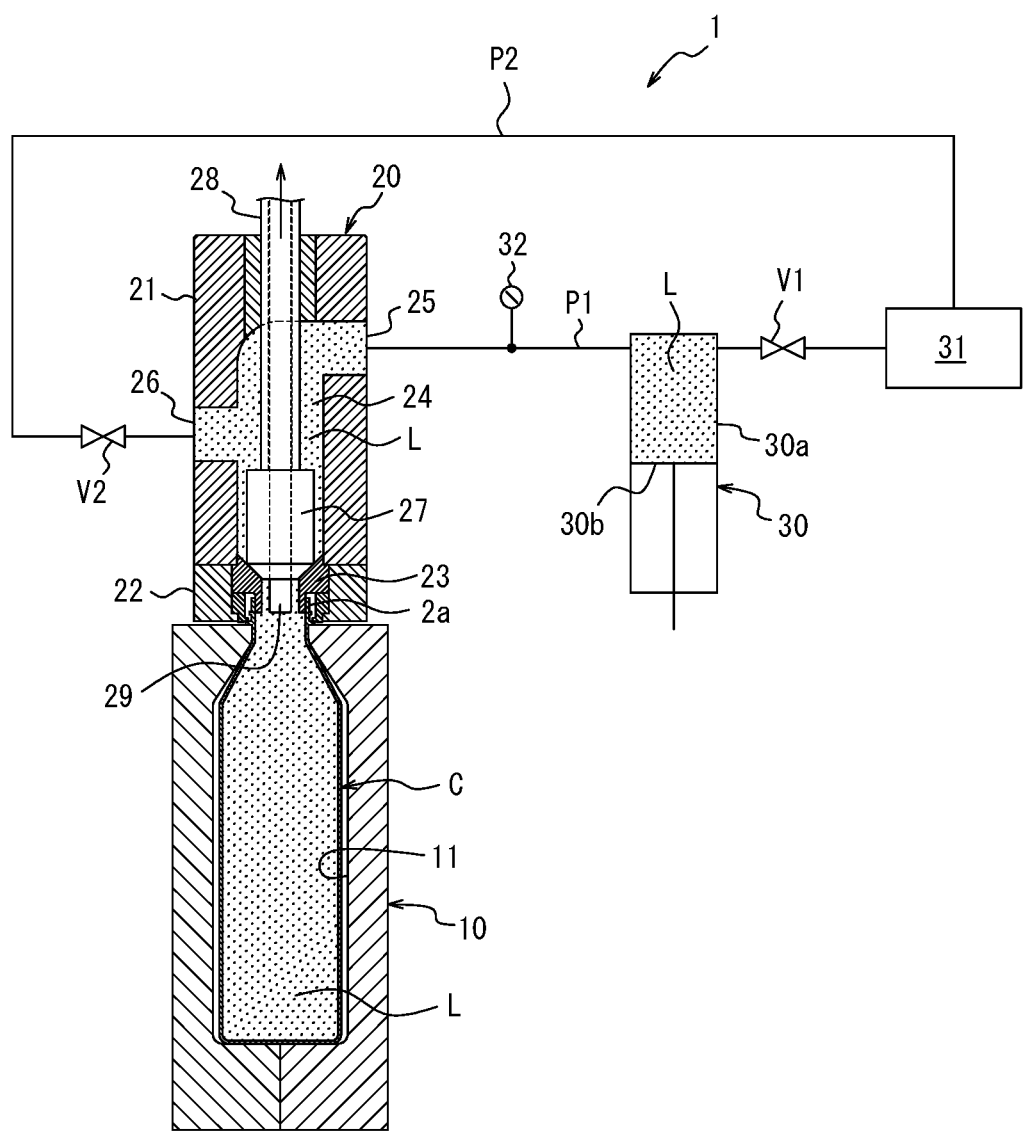
FIG. 6 is an explanatory diagram illustrating the liquid blow molding apparatus during a withdrawing step after the closing step.

When a predetermined volume of liquid L is sucked back from the liquid containing container C into the supply path 24 in the suck-back step, subsequently the nozzle closing step is performed. In the nozzle closing step, as illustrated in FIG. 6, the blow nozzle 23 is closed by the sealing body 27 with a predetermined volume of liquid L sucked back into the supply path 24 out of the liquid containing container C molded into a predetermined shape in the suck-back step.

It is to be noted that, when the liquid blow molding apparatus 1 is provided with the stretching rod 29, after the nozzle closing step, a withdrawing step in which the stretching rod 29 is withdrawn from the liquid containing container C molded in the molding step can be performed. When the stretching rod 29 is withdrawn from the liquid containing container C, the content volume of the liquid containing container C can be further reduced by the volume of the stretching rod 29. In this case, the volume of the liquid L sucked back out of the liquid containing container C into the supply path 24 in the suck-back step is set in consideration of reduction in the content volume caused by withdrawal of the stretching rod 29 from the liquid containing container C.

Figure 7:
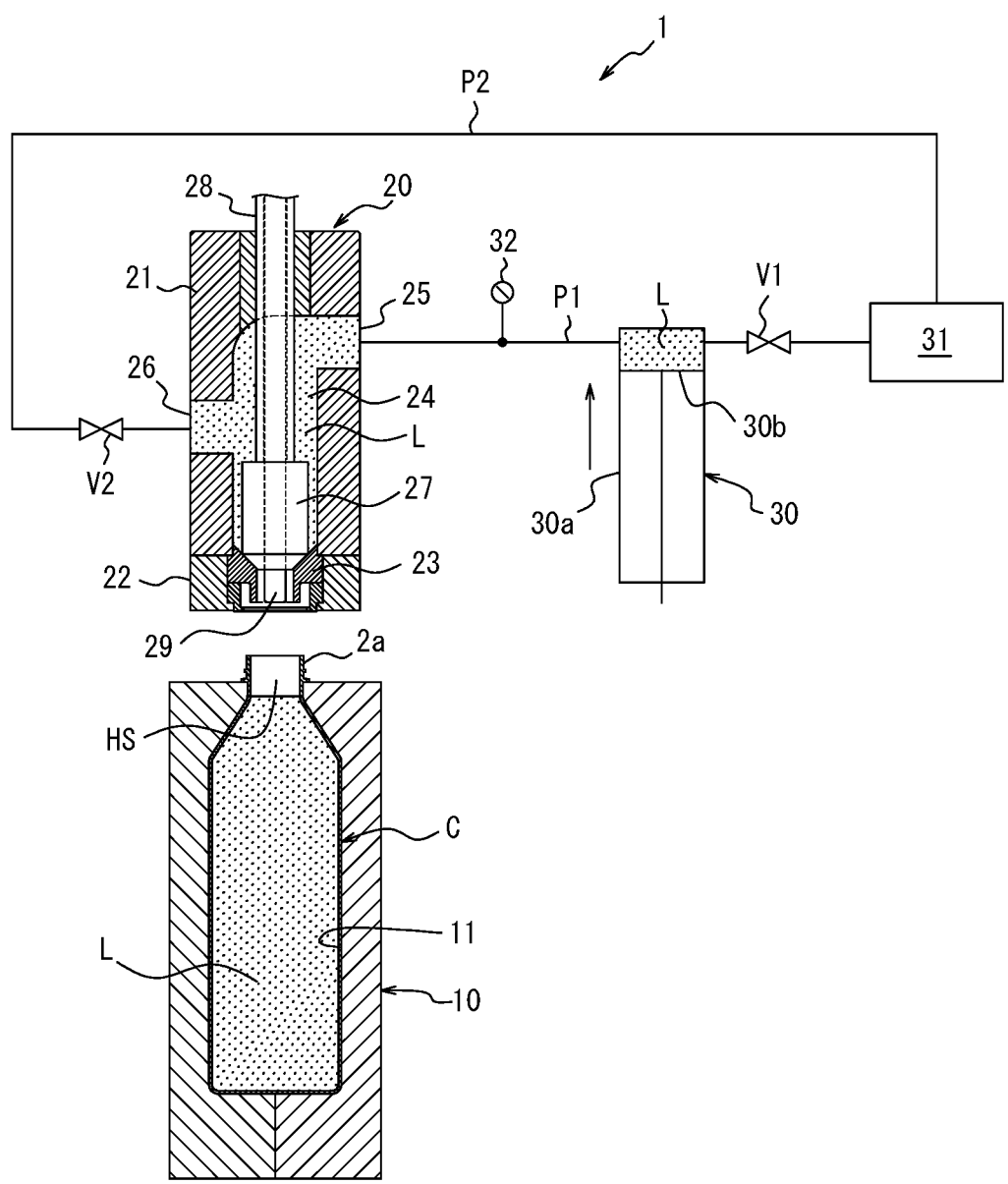
FIG. 7 is an explanatory diagram illustrating the liquid blow molding apparatus during a discharge step.

When the nozzle closing step is finished, subsequently the discharge step is performed. In the discharge step, as illustrated in FIG. 7, the opening-closing valve V2 is opened with the sealing body 27 and the opening-closing valve V1 closed, and while remaining in this state, the pump 30 is operated in the positive direction. In other words, the pump 30 is operated in the positive direction with the discharge port 26 connected to the supply path 24 opened. Thus, the liquid L held inside the supply path 24 is discharged by a predetermined volume, toward the collection path P2, from the discharge port 26 out of the supply path 24.

Here, in the molding step in which a pressurized liquid L is supplied into the preform 2 to mold a liquid containing container C of a predetermined shape, the liquid L catches the air present in the preform 2 as it is supplied into the preform 2. Thus, when the suck-back step is performed, the liquid L containing a lot of air bubbles is taken into the supply path 24. However, in the disclosed liquid blow molding method, the discharge step is performed after the suck-back step, thus the liquid L containing air bubbles sucked back into the supply path 24 in the suck-back step can be discharged from the discharge port 26 out of the supply path 24. Accordingly, supply of the liquid L containing a lot of air bubbles into the preform 2 in the subsequent molding step is prevented, and the volume and the pressure of the liquid L to be supplied into the liquid containing container C after molding is stabilized. Thus the liquid containing container C can be molded with a high accuracy.

In the discharge step, preferably, the liquid L of the same volume as that of the liquid L sucked back into the supply path 24 in the suck-back step is discharged out of the supply path 24 from the discharge port 26. Thus, the liquid L containing air bubbles sucked back into the supply path 24 in the suck-back step is reliably discharged out of the supply path 24, and a liquid containing container C can be molded with a higher accuracy.

The liquid L discharged out of the supply path 24 from the discharge port 26 in the discharge step is collected in supply tank 31 through the collection path P2. Further, in the supply tank 31, air bubbles mixed into the liquid L are discharged to outside, thus the bubbles are prevented from mixing into the liquid L to be supplied to the pump 30. With the aforementioned configuration, the liquid L discharged out of the supply path 24 in the discharge step can be reused, and the production cost of the liquid containing container C by the liquid blow molding method can be reduced.

In the illustrated example, the discharge port 26 is provided in the vertically middle position of the supply path 24, and the position can be changed. For example, when the liquid L has a relatively low viscosity such as water, the air bubbles mixed into the liquid L suddenly float upward in the supply path 24. Thus, preferably, the discharge port 26 is provided in the upper part of the supply path 24 to effectively discharge the liquid L containing air bubbles out of the supply path 24. On the other hand, when the liquid L has a comparatively high viscosity such as shampoo or liquid detergent, the air bubbles mixed into the liquid L slowly float upward in the supply path 24. Thus, preferably, the discharge port 26 is provided in the lower part of the supply path 24 to effectively discharge the liquid L containing air bubbles out of the supply path 24.

As illustrated in FIG. 7, although the discharge step may be performed after the nozzle unit 20 is moved upward and the blow nozzle 23 is withdrawn from the mouth 2a (the same reference sign as that of the mouth 2a of the preform 2 is assigned since they have the same shape) of the liquid containing container C after molding, it may be performed with the blow nozzle 23 engaged with the mouth 2a.

When the blow nozzle 23 is withdrawn from the mouth 2a of the liquid containing container C after molding, a predetermined volume of liquid L is filled in the liquid containing container C and a predetermined volume of headspace is formed therein. Further, in that state, a cap is fitted to the mouth 2a by a capping device not illustrated, and subsequently the mold 10 is opened to take out a finished liquid containing container C from the mold 10. It is to be noted that a cap may be fitted after a liquid containing container C is taken out from the mold.

As aforementioned, according to the disclosed liquid blow molding method, in the suck-back step, the liquid L containing air bubbles sucked back from the liquid containing container C after molding into the supply path 24 can be discharged from the discharge port 26 out of the supply path 24. Thus, in the subsequent molding step, the liquid L containing a lot of air bubbles is prevented from being supplied into the preform 2, and the liquid containing container C can be molded with a high accuracy. In particular, when a container having a large headspace therein such as a liquid containing container used for a container with pump configured to hold shampoo or the like as a content liquid is molded, a lot of air bubbles may enter into the supply path 24 in the suck-back step. However, even in that case, the liquid L containing air bubbles sucked back into the supply path 24 is reliably discharged from the discharge port 26 out of the supply path 24, and thus the liquid containing container C can be molded with a high accuracy.

Needless to say, the present disclosure is not limited to the aforementioned embodiment, and various changes may be made without departing from the gist of the present disclosure.

For example, although the above embodiment describes the case where the disclosed liquid blow molding method is implemented by using the liquid blow molding apparatus 1 configured as illustrated in FIG. 1, the disclosed liquid blow molding method may be implemented by using a liquid blow molding apparatus configured in a different manner or the like.

Further, in the above embodiment, although in the molding step, biaxial stretch blow molding is performed by using the stretching rod 29 and the withdrawing step in which the stretching rod 29 is withdrawn from the liquid containing container C is performed as well, the withdrawing step for stretching by using the stretching rod 29 and for forming a headspace HS may be omitted (e.g. the stretching rod may be withdrawn between the molding step and the nozzle closing step).

Moreover, the disclosed liquid blow molding method may be applied not only to mold a container having a large headspace therein such as a liquid containing container used for a container with pump for holding shampoo or the like as a content liquid, and may be also applied to mold a variety of liquid containing containers regardless of the size of the headspace.

Furthermore, in the aforementioned embodiment, the pump 30 is a plunger pump. However, the pump is not limited thereto, and a variety of pumps may be used as long as it can pressurize the liquid L to a predetermined pressure and supply it to the preform 2 and can suck back a predetermined volume of liquid L out of the liquid containing container C after molding.

REFERENCE SIGNS LIST

1 Liquid blow molding apparatus
2 Preform
2a Mouth
2b Trunk
10 Mold
11 Cavity
20 Nozzle unit
21 Main body block
22 Support block
23 Blow nozzle
24 Supply path
25 Supply port
26 Discharge port
27 Sealing body
28 Shaft body
29 Stretching rod
30 Pump
30a Cylinder
30b Piston
31 Supply tank
32 Pressure gauge
L Liquid
P1 Supply path
V1 Opening-closing valve
P2 Collection path
V2 Opening-closing valve
C Liquid containing container
HS Headspace

The invention claimed is:

1. A liquid blow molding method for molding a bottomed tubular-shaped preform into a liquid-containing container in which a content liquid is held, the method comprising:
a nozzle engaging step of engaging a blow nozzle with a mouth of the preform, the blow nozzle being connected to a pump through a supply path;
a molding step of supplying a pressurized liquid from the pump through the supply path and through the blow nozzle into the preform to mold the preform into a container of a predetermined shape;
a suck-back step of suctioning a predetermined volume of liquid out from an interior of the container, which was molded into the predetermined shape in the molding step, and into the supply path by operating the pump in a reverse direction;
a nozzle closing step of closing the blow nozzle by a sealing body with the container molded into the predetermined shape; and
a discharge step of discharging the liquid suctioned back into the supply path by the predetermined volume from a discharge port out of the supply path by operating, after the nozzle closing step, the pump in a positive direction with the discharge port connected to the supply path opened.

2. The liquid blow molding method according to claim 1, wherein in the molding step, the preform is stretched in an axial direction by a stretching rod; and
after the nozzle closing step, the liquid blow molding method further comprises a withdrawing step of withdrawing the stretching rod from the container molded into the predetermined shape in the molding step.

3. The liquid blow molding method according to claim 1, wherein a liquid discharged from the discharge port out of the supply path in the discharge step is collected in a supply tank configured to supply a liquid to the pump through a collection path.

4. The liquid blow molding method according to claim 1, wherein a liquid of the same predetermined volume as the liquid suctioned back into the supply path in the suck-back step is discharged from the discharge port out of the supply path in the discharge step.

5. The liquid blow molding method according to claim 2, wherein a liquid discharged from the discharge port out of the supply path in the discharge step is collected in a supply tank configured to supply a liquid to the pump through a collection path.

6. The liquid blow molding method according to claim 2, wherein a liquid of the same predetermined volume as the liquid suctioned back into the supply path in the suck-back step is discharged from the discharge port out of the supply path in the discharge step.

7. The liquid blow molding method according to claim 3, wherein a liquid of the same predetermined volume as the liquid suctioned back into the supply path in the suck-back step is discharged from the discharge port out of the supply path in the discharge step.

8. The liquid blow molding method according to claim 5, wherein a liquid of the same predetermined volume as the liquid suctioned back into the supply path in the suck-back step is discharged from the discharge port out of the supply path in the discharge step.

* * * * *